3,300,494
PYRAZINAMIDOGUANIDINE PRODUCTS
Edward J. Cragoe, Jr., Lansdale, Pa., assignor to Merck & Co., Inc., Rahway, N.J., a corporation of New Jersey
No Drawing. Filed Sept. 27, 1963, Ser. No. 311,291
26 Claims. (Cl. 260—250)

This application is a continuation-in-part of application 234,213 filed October 30, 1962 and now abandoned.

This invention is concerned with (3-amino-pyrazinamido)guanidine compounds having at least one halogen or halogen-like substituent attached to the pyrazine nucleus. These compounds can be represented by the following structure:

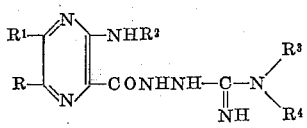

and pharmaceutically acceptable salts thereof, wherein R can be hydrogen or a halogen substituent such as chlorine, bromine, iodine, or a trihalomethyl radical, the latter including, for example, trifluoromethyl and trichloromethyl radicals.

$R^1$ can be hydrogen or an amino group, such as an amino group of the formula

wherein $R^5$ can be hydrogen, a lower alkyl radical, or a lower alkenyl radical, and $R^6$ can be hydrogen, lower alkoxy, lower alkyl either straight or branched chain or cyclic (3- to 6-membered rings) and either unsubstituted or containing one or more substituents such as hydroxyl, halogen (chlorine, bromine, fluorine and the like), a cycloalkyl substituent having 3 to 6 carbons in the cycloalkyl structure, an aryl substituent preferably phenyl or substituted phenyl such as lower-alkyl-phenyl and halophenyl as chlorophenyl, bromophenyl, fluorophenyl, and the like, or a heterocyclic substituent especially furyl, pyridyl, and $(CH_2)_nN-$ wherein $n$ is one of the numerals 4 through 7, or an amino substituent as the unsubstituted amino, or mono- or di-lower-alkyl amino, lower alkenyl, aryl, advantageously an unsubstituted or substituted phenyl, wherein the substituent(s) are preferably halogen (chlorine, bromine, fluorine) or lower alkyl (methyl, ethyl, propyl, isopropyl) and the like, and when $R^5$ and $R^6$ each represents a lower alkyl, the lower alkyl groups can be linked together to form a cyclic structure with the nitrogen atom to which they are attached, particularly a 5- to 8-membered ring, advantageously forming with the nitrogen atom a 1-pyrrolidinyl, piperidino, hexahydro-1-azepinyl, or octahydro-1-azocinyl radical and the like;

$R^2$ can be hydrogen or acyl, for example $R^7CO-$ wherein $R^7$ is hydrogen or a lower alkyl radical; and $R^3$ and $R^4$ can be similar or dissimilar radicals and each represents: hydrogen, lower alkyl which can be straight or branched (but preferably straight) chain or cyclic (3- to 6-membered rings) and either unsubstituted or containing one or more substituents such as hydroxyl, halogen, an aryl substituent, preferably phenyl or substituted phenyl, the substituent preferably being lower alkyl, halogen, as chloro, bromo, fluoro and the like, an amino, preferably a di-lower alkylamino, and wherein the alkyl groups can be linked either directly together or through a hetero atom, such as oxygen, to form a cyclic structure with the amino nitrogen, lower alkyl groups which are linked directly together or through a hetero atom to form a cyclic structure with the nitrogen atom to which they are attached, particularly to form a 5- or 6-membered ring, thus forming with the nitrogen atom, for example, a 1-pyrrolidinyl, piperidino or a morpholino radical, aryl, preferably a mononuclear aryl as phenyl or substituted (halogen, lower alkyl) phenyl, amino or substituted amino, preferably di-lower alkylamino.

The compounds of this invention are useful because they possess natriuretic properties. They differ from most of the known, effective diuretic agents, however, in that the compounds of this invention selectively enhance the excretion of sodium ions without causing an increase in excretion of potassium ions. The potassium loss which is caused by the known diuretics often results in a severe muscular weakness. As the compounds of this invention are relatively free of this induced potassium depletion, they have this decided advantage as diuretics. As diuretic agents they may be used for the treatment of edema, hypertension and other diseases known to be responsive to this therapy.

It has also been found as another feature of this invention that the novel (3-aminopyrazinamido)guanidines, when co-administered with other diuretic agents known to enhance the elimination of potassium ions along with sodium ions, will reduce the excretion of potassium ions and thus overcome this undesirable property of these other diuretic agents. The compounds of this invention, therefore, are additionally useful in combination with other classes of diuretic agents to prevent the loss of potassium which they otherwise would cause to be eliminated, as well as being useful by themselves as diuretic and/or saluretic agents.

In some instances it may be desirable to make a salt of these compounds, using a pharmaceutically acceptable acid, and these salts are to be considered as included in this invention and in the scope of the claims.

The compounds of the invention can be made by several different chemical processes and a particular process may be more useful than another for making a specific compound. One generally useful process can be represented as follows:

METHOD A

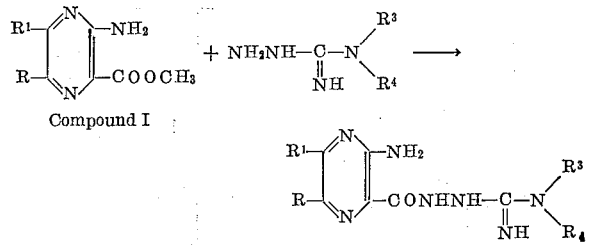

Compound I

The radicals R, $R^1$, $R^3$ and $R^4$ in this reaction are as above defined. The methyl ester is shown for illustrative purposes only, as the ester may be that of certain other alcohols, especially lower aliphatic alcohols. It will be noted that this alkoxy radical does not appear in the desired end product.

The synthesis by Method A is preferably carried out under anhydrous conditions and either with or without a solvent such as methanol, ethanol, or isopropyl alcohol. The desired product is usually recovered by concentrating the reaction mixture by distillation of the solvent at reduced pressure, cooling and removing the solid that separates by filtration. Purification is frequently carried out by converting the product to a salt, such as the hydrochloride, and recrystallizing from an appropriate solvent or solvent mixture.

The starting compound, I, is made by one of two methods depending upon whether $R^1$ is hydrogen or an amino group.

When $R^1$ in starting compound I is hydrogen, these products are prepared by halogenation of the known 3-aminopyrazinoic acid ester. With chlorine or bromine, this halogenation advantageously is effected in the presence of water or a mixture of water and an acid such as a mineral acid as hydrochloric acid, hydrobromic acid and the like or acetic acid or a mixture of water and an organic solvent such as dimethylformamide. Should a halogen be introduced simultaneously on the 3-amino-group, this can readily be removed by the interaction of the product with a bisulfite such as an alkali metal bisulfite.

Iodination is carried out by treating the known ester of 3-aminopyrazinoic acid with mercuric acetate and iodine. The trifluoromethyl radical is obtained on the nucleus by heating 1,1,1-trifluoro-3,3-dibromo-2-propanone with aqueous sodium acetate, cooling and treating the product with aminomalonamidamidine to thereby give 3-amino-6-(or 5-)trifluoromethylpyrazinamide. This amide gives, on mild hydrolysis, 3-amino-6-(or 5-)trifluoromethylpyrazinoic acid which is converted to the corresponding lower alkyl ester by the usual reaction with methanol or other lower alkanol.

When $R^1$ is an amino substituent, the synthesis of the starting compounds (I) varies depending upon the nature of the 6-halogen substituent. A generally useful process for the preparation of the 6-chloro, 6-bromo and 6-iodo derivatives can be represented as follows:

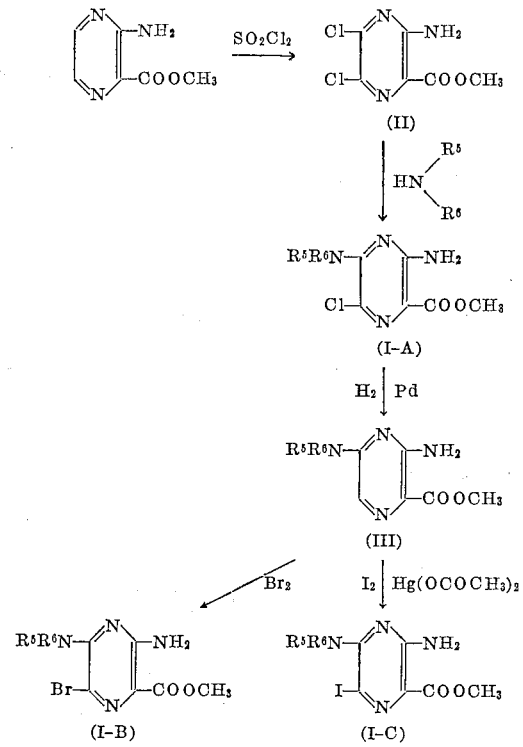

Chlorination of the known 3-aminopyrazinoic acid ester with sulfuryl chloride produces a 3-amino-5,6-dichloropyrazinoic acid ester. This Compound (II) reacts with ammonia in dimethyl sulfoxide as a solvent to produce methyl 3,5-diamino-6-chloropyrazinoate. Reaction of Compound II with an amine of the structure $R^5R^6NH$ gives the methyl 3,5-diamino-6-chloropyrazinoate (I-A). The reaction usually is carried out under anhydrous conditions in a solvent, preferably a secondary or tertiary alcohol, such as 2-propanol or tert.-butyl alcohol (methanol and ethanol are contraindicated). When an arylamine is used, some of the corresponding arylamine hydrochloride is advantageously incorporated in the reaction mixture.

The chlorine atom is removed readily from Compound I-A by catalytic hydrogenolysis using a catalyst of palladium supported on charcoal in the presence of a base, preferably magnesium oxide. The product, Compound III, serves as an intermediate for the synthesis of both the 6-bromo and 6-iodo analogs. Treatment of Compound III with bromine in acetic acid produces the 6-bromo analog, compound I-B. Iodination of Compound III using iodine and mercuric acetate in aqueous dioxane produces the 6-iodo analog, Compound I-C.

As mentioned, the methyl ester is shown for illustrative purposes only since the ester may be that of certain other alcohols, especially lower aliphatic alcohols.

A second method for preparing the compounds of this invention can be represented as follows:

METHOD B

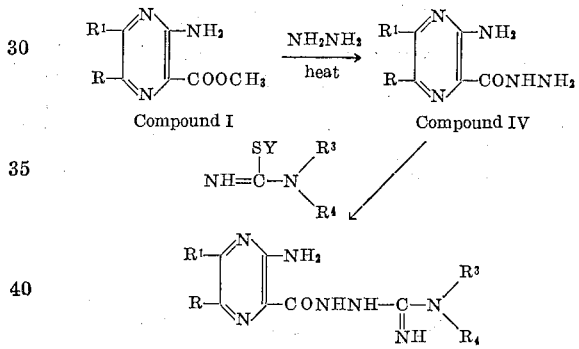

Y can be lower alkyl or aralkyl such as benzyl.

The hydrazide Compound IV is obtained in a conventional manner and it is heated with a 2-methyl-2-thiopseudourea which advantageously has been dissolved in dimethyl sulfoxide. The desired end product is recovered by removing the solvent by distillation at reduced pressure and extracting the residue with aqueous hydrochloric acid. The extract upon cooling yields the crystalline hydrochloride of the product. If desired, the extract can be neutralized with base, whereby the free base form of the product separates.

A third method of preparation can be represented as follows:

METHOD C

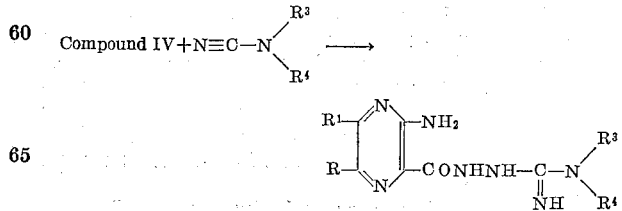

This method involves heating the reactants together in aqueous alcohol containing hydrochloric acid. The desired product is recovered by cooling and neutralizing the reaction mixture. The solid that separates is removed by filtration and can be purified by conversion to a salt and recrystallizing from an appropriate solvent.

A fourth method involves the following steps:

METHOD D

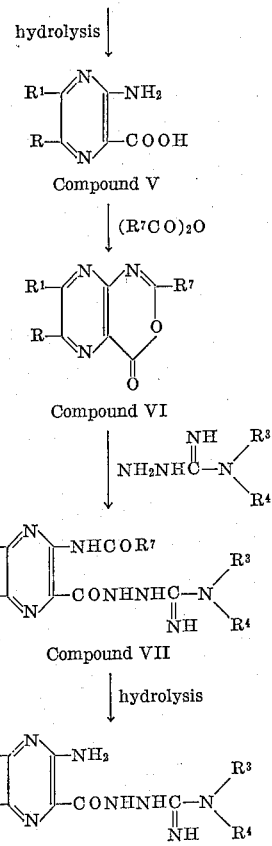

Compound I is hydrolyzed by dilute alkali to obtain a 3-aminopyrazinoic acid (Compound V). When Compound V is heated with a lower alkanoic acid anhydride ($R^7CO$—O—CO—$R^7$) a 2 - alkyl - 4H - pyrazino[2,3-d]-[1,3]oxazin-4-one (Compound VI) is obtained. To obtain the Compound VI in which $R^7$ equals hydrogen, Compound V is heated with a mixture of formic acid and acetic anhydride. Compound VI then is dissolved in a solvent such as ethyl acetate, for example, and is heated in an atmosphere of nitrogen with the aminoguanidine to obtain Compound VII. Compound VII will be recognized as one of the compounds of the invention having an acyl radical attached to the amino group at the 3-position of the nucleus. This acyl group can be removed readily by hydrolysis.

As mentioned above, the acid salts of these compounds can be prepared by any suitable, known method. Particularly useful salts are the hydrohalide salts as hydrochloride, hydrobromide, hydriodide, the sulfate, phosphate and other inorganic acid salts, as well as organic acid salts as the acetate, maleate, tartrate and the like salts.

The following examples are illustrative of the methods by which the products of this invention can be prepared and are not to be considered as limiting the invention to the particular procedural conditions employed or to the particular compounds prepared thereby.

*Example 1 (by method A)*

(3-AMINO-6-CHLOROPYRAZINAMIDO)GUANIDINE HYDROCHLORIDE

*Step A: Preparation of methyl 3 - amino - 6 - chloropyrazinoate.*—A 5-liter, 3-necked flask equipped with a mechanical stirrer, thermometer and gas inlet tube is charged with a warm (about 38° C.) mixture of water (3180 ml.) and glacial acetic acid (750 ml.) and methyl 3-aminopyrazinoate (90 g., 0.588 mole) then is added. The stirrer is started and the mixture heated to 41° C. which causes nearly all the ester to dissolve. The solution then is cooled to just below 40° C. via an ice bath. With vigorous stirring, chlorine (about 140 g.) is passed through the solution over a period to 25 minutes. A precipitate begins to form after five minutes and becomes voluminous by the end of the reaction. The temperature drops to 20–25° C. during the reaction. The nearly white precipitate, which is methyl 3-chloroamino-6-chloropyrazinoate, is removed by filtration and washed with a small amount of ice water. A small amount of this material, when recrystallized from warm acetic acid, melts at 142° C. (dec.)

*Analysis.*—Calculated for $C_6H_5Cl_2N_3O_2$: C, 32.46; H, 2.27; N, 18.93; Cl (total) 31.94; Cl (active) 15.97. Found: C, 32.82; H, 2.34; N, 18.90; Cl (total) 32.09; Cl (active) 16.06.

The moist methyl 3-chloroamino-6-chloropyrazinoate and a solution of sodium bisulfite (150 g.) in water (900 ml.) are placed in a 4-liter beaker and stirred mechanically for one-half hour. The temperature of the mixture is maintained at 25° C. by addition of ice. The light yellow methyl 3-amino-6-chloropyrazinoate is removed by filtration, suspended in 150 ml. of ice water and filtered. This process is repeated twice with 150 ml. portions of ice water and once with a 50 ml. portion of cold isopropyl alcohol. After drying in the air there is obtained 60 g. (55%) of methyl 3-amino-6-chloropyrazinoate, M.P. 159–161° C.

*Analysis.*—Calculated for $C_6H_6ClN_3O_2$: C, 38.42; H, 3.22; N, 22.40; Cl, 18.90. Found: C, 38.81; H, 3.54; N, 22.83; Cl, 18.39.

*Step B: Preparation of aminoguanidine hydrochloride.*—Aminoguanidine bicarbonate (275 g., 2 mole) is suspended in 1500 ml. of water in a 5 liter, 3-necked flask fitted with a mechanical stirrer. The mixture is stirred rapidly and heated to 50–60° C. on a steam bath. The heat source is removed, rapid stirring is maintained and a slow stream of 12.2 N hydrochloric acid is added over 30 minutes. When all the acid has been added (300 ml., 3.66 mole) the solution is brought to boiling and the solvent removed by distillation. The last traces of water are removed by reduced pressure distillation (water aspirator) to give a white solid. This material is recrystallized from 4 liters of absolute ethanol, and dried in the air at room temperature, yielding 211 g. (95%) of aminoguanidine hydrochloride, M.P. 160–162° C.

Larger runs can be made using a mush consisting of aminoguanidine bicarbonate (500 g., 3.64 mole) and water (200 ml.). Hydrochloric acid (37–38%) (about 330 ml., 4 mole) is added with stirring until the solution is acidic. Since the reaction is endothermic, the application of heat is necessary. The work-up is the same as described above.

*Step C: Preparation of (3-amino-6-chloropyrazinamido)guanidine hydrochloride.*—Aminoguanidine hydrochloride (120 g., 1.1 mole) is placed in a 3-liter pask, protected from the atmosphere via a drying tube, and dissolved in 2 liters of boiling absolute ethanol. The heat source is removed and a solution of sodium ethoxide [prepared from sodium metal (23 g., 1.0 mole) in 500 ml. of absolute ethanol under anhydrous conditions] is added slowly with rapid swirling of the flask. Sodium chloride precipitates as a fine white solid. The mixture is allowed to cool to room temperature, and finely powdered methyl 3-amino-6-chloropyrazinoate (100 g., 0.53 mole) is added. The flask is placed on a rotary vacuum evaporator in a bath at 25–35° C. and the reaction mixture concentrated to a volume of about 600 ml. during a period of about 6 hours. The reaction vessel then is flushed with nitrogen and the yellow-orange mixture allowed to stand in the stoppered flask at room temperature for 20 hours.

The bright orange solid is removed by filtration and stirred with 400 ml. of cold absolute ethanol. After filtration, it is stirred, followed by filtration, with two 300 ml. portions of distilled water. After the final filtration, the solid is pressed as dry as possible with a rubber dam and, finally, dried in a vacuum oven at 100° C. for 20 hours giving 58 g. of (3-amino-6-chloropyrazinamido)guanidine.

This compound is finely powdered in a mortar, mixed with 200 ml. of 6 N hydrochloric acid, and heated on a steam bath with stirring for 15 minutes. The hot mixture then is filtered through a steam heated sintered glass funnel and the filtrate cooled to 0° C. The product which separates is removed by filtration, recrystallized three times using 400 ml. portions of a mixture of water (3 volumes) and isopropyl alcohol (7 volumes) with concomitant clarification with Darco yielding 24 gm. (17%) of (3-amino-6-chloropyrazinamido)guanidine hydrochloride, M.P. 277–278° C. (dec.).

*Analysis.*—Calculated for $C_6H_9Cl_2N_7O$: C, 27.08; H, 3.41; N, 36.85; Cl, 26.65. Found: C, 27.22; H, 3.80; N, 36.81; Cl, 26.50.

The product is obtained as the hydrochloride salt but other salts can be prepared, such as the following:

(*3 - amino - 6 - chloropyrazinamido*)*guanidine hydrogen maleate* is prepared by dissolving (3-amino-6-chloropyrazinamido)guanidine hydrochloride (2 g., 0.008 mole) in warm water (10 ml.) and adding maleic acid (3.5 g., 0.03 mole) in water (3 ml.). The yellow maleate salt which separates upon cooling is isolated and recrystallized from water. The M.P. is 210–212° C. (dec.).

*Analysis.*—Calculated for $C_{10}H_{12}ClN_7O_5$: C, 34.74; H, 3.50; N, 28.36. Found: C, 34.67; H, 3.52; N, 28.20.

Similarly, if concentrated sulfuric acid (2 g., 0.05 mole) is used in place of the maleic acid, (*3-amino-6-chloropyrazinamido*)*guanidine sulfate hydrate*, M.P. 209–211° C. (dec.) is obtained.

*Analysis.*—Calculated for $C_{12}H_{18}Cl_2N_{14}O_6S \cdot H_2O$: C, 25.05; H, 3.50; N, 34.09. Found: C, 25.69; H, 3.77; N, 34.25.

Similarly, if phosphoric acid (6 ml.) is used in place of the maleic acid (*3-amino-6-chloropyrazinamido*)*guanidine phosphate hydrate*, M.P. 280–280.5° C. (dec.) is obtained.

*Analysis.*—Calculated for $C_{18}H_{27}Cl_3N_{21}O_7P \cdot H_2O$: C, 26.86; H, 3.63; N, 36.55. Found: C, 26.68; H, 3.76; N, 36.44.

*Example 2 (by method B)*

(3-AMINO-6-CHLOROPYRAZINAMIDO)GUANIDINE HYDROCHLORIDE

*Step A.—Preparation of 3-amino-6-chloropyrazinoic acid hydrazide.*—Methyl 3-amino - 6 - chloropyrazinoate, from Example 1, Step A (94 g. 0.50 mole) and absolute ethanol (2.2 liters) are placed in a 3 liter, round-bottom flask, fitted with a reflux condenser and refluxed on a steam bath. As soon as the ester dissolves, hydrazine (32 g., 1.0 mole) is added to the solution and refluxing continued 2 hours. After refluxing for about ten minutes the major portion of the product separates from the reaction mixture. At the end of the heating period the mixture is chilled to 0° C. and the product filtered, washed well with cold ethanol and dried yielding 94 g. (100%) of 3-amino-6-chloropyrazinoic acid hydrazide, M.P. 218–220° C. Recrystallization from ethanol followed by sublimation gives material with little change in M.P.

*Analysis.*—Calculated for $C_5H_6ClN_5O$: C, 32.01; H, 3.22; N, 37.33. Found: C, 31.74; H, 2.98; N, 37.45.

*Step B.—Preparation of (3-amino-6-chloropyrazinamido)guanidine hydrochloride.*—In a 1 liter, 3-necked, round-bottom flask fitted with a mechanical stirrer, drying tube and gas bubbler tube are placed 3-amino-6-chloropyrazinoic acid hydrazide (5.0 g., 0.027 mole) and 50 ml. of dimethyl sulfoxide. A slow stream of nitrogen is admitted while the mixture is heated on a steam bath and stirred until a clear solution results.

In the meantime the 2-methyl-2-thiopseudourea hydriodide (11 g., 0.036 mole) is suspended in dimethyl sulfoxide (150 ml.) and sodium methoxide (2.65 g., 0.049 mole) are added. The mixture is heated on a steam bath until a clear solution is obtained. This solution is added to the above hydrazide solution and the whole heated on a steam bath 20 hours, while nitrogen is slowly admitted throughout the reaction period.

A second charge of 2-methyl-2-thiopseudourea hydriodide (11 g., 0.036 mole) and sodium methoxide (2.65 g., 0.049 mole) in 150 ml. of dimethyl sulfoxide is prepared as before and added to the reaction mixture. Heating in an atmosphere of nitrogen is continued for another 24 hours.

The flask then is fitted with a vacuum distillation apparatus and the dimethyl sulfoxide removed by distillation at 1 mm. pressure on the steam bath. When solvent ceases to distil, an orange gell remains in the reaction vessel. This is dissolved in 100 ml. of 2% hydrochloric acid at room temperature, clarified with Darco at room temperature, and made basic (to pH=11.5) by stirring and adding 10% sodium hydroxide. After chilling to 0–5° C., the yellow solid that precipitates is removed by filtration, suspended in 5% sodium hydroxide, stirred and filtered. This process is repeated twice with distilled water and the final product filtered and pressed with a rubber dam to remove as much water as possible. The solid then is mixed with 10 ml. of 10% hydrochloric acid, cooled to 0° C., the paste is filtered, washed on the filter with absolute isopropyl alcohol and finally recrystallized from 33 ml. of 3:7 aqueous isopropyl alcohol with concomitant clarification with Darco, yielding 3.3 g. (47%) of (3-amino-6-chloropyrazinamido)guanidine hydrochloride, M.P. 277–278° C. (dec.).

*Example 3 (by method C)*

(3-AMINO-6-CHLOROPYRAZINAMIDO)GUANIDINE HYDROCHLORIDE

A paste of 3-amino-6-chloropyrazinoic acid hydrazide, from Example 2, Step A (25 g., 0.133 mole), and absolute ethyl alcohol (400 ml.) is placed in a 1 liter, round-bottom flask. Hydrochloric acid (44 ml. of 10% solution) is added and the whole heated to reflux on a steam bath. Cyanamide (6.8 g., 0.16 mole) dissolved in 25 ml. of absolute ethanol is added, and the mixture refluxed 5 hours. More cyanamide (6.8 g., 0.16 mole) and hydrochloric acid (11 ml. of 36% solution) are added, and reflux continued 15 hours. The flask then is fitted with a mechanical stirrer and the solution cooled to 10° C. with rapid stirring. Ammonia (20 ml. of 15 N solution) is added, and stirring and cooling continued for 15 minutes whereupon a yellow solid precipitates. This is filtered, pressed dry with a rubber dam, and finally treated with 30 ml. of 10% hydrochloric acid solution and cooled to 0–5° C. (3-amino-6-chloropyrazinamido)guanidine hydrochloride precipitates as a yellow solid which is recrystallized twice from 3:7 aqueous isopropyl alcohol, M.P. 277–278° C. (dec.); yield, 23.5 g. (66%).

*Example 4 (by method D)*

(3-AMINO-6-CHLOROPYRAZINAMIDO)GUANIDINE HYDROCHLORIDE

*Step A: Preparation of 3-amino-6-chloropyrazinoic acid.*—Methyl 3-amino-6-chloropyrazinoate, from Example 1, Step A (150 g., 0.8 mole), is added to a 2.5 N sodium hydroxide solution (800 ml.) and the mixture stirred and heated 1.5 hours on the steam bath. The suspension of the sodium salt of the pyrazinoic acid which results is cooled, and collected on a filter. The salt then is dissolved in 2400 ml. of boiling water and the solution filtered and acidified with concentrated hydrochloric acid. The mixture is cooled and the precipitated product is collected, washed with water, and dried in a 70° C. oven to give 127 g. (92%) of 3-amino-6-chloropyrazinoic acid, M.P. 172–174° C. (dec.). After recrystallizing from ethanol, the product melts at 178.5–179.5° .C

*Analysis.*—Calculated for $C_5H_4ClN_3O_2$: C, 34.60; H, 2.32; N, 23.66. Found: C, 34.93; H, 2.55; N, 24.21.

*Step B: Preparation of 2-methyl-6-chloro-4H-pyrapino [2,3-d][1,3]oxazin-4-one.* — 3-amino-6-chloropyrazinoic acid (127 g., 0.73 mole) and acetic anhydride (550 ml.) are stirred and heated one hour on the steam bath. The resulting solution is chilled and the product, which crystallizes, collected on a filter. The solid is triturated with 200 cc. of ethyl acetate, collected on a filter and dried to constant weight in a vacuum desiccator, yielding 97 g. (67%) of 2-methyl-6-chloro-4H-pyrazino[2,3-d][1,3]oxazin-4-one, M.P. 155–158° C. (dec.). After recrystallization from ethyl acetate the M.P. is 158–160° C. (dec.).

*Analysis.*—Calculated for $C_7H_4ClN_3O_2$: C, 42.55; H, 2.04; N, 21.27; Found: C, 42.59; H, 2.14; N, 21.19.

*Step C: Preparation of (3-acetamido - 6 - chloro-pyrazinamido)guanidine.*—Sodium metal (1 g., 0.004 mole) is dissolved in 25 ml. of boiling ethyl alcohol and added to a solution of aminoguanidine hydrochloride, Example 1, Step B (5 g., 0.045 mole), in 100 ml. of ethyl alcohol, The sodium chloride which precipitates as a fine white solid is removed by filtration under anhydrous conditions.

In the meantime, 2-methyl-6-chloro-4H-pyrazino[2,3d][1,3]oxazin-4-one (6 g., 0.03 mole) is dissolved in 125 ml. of boiling ethyl acetate. Upon mixing the two solutions, a yellow solid precipitates immediately. The mixture then is cooled to 0–5° C. and the solid filtered and washed with a little ethanol yielding 1.2 g. (44%) of (3 - acetamido - 6 - chloropyrazinamido)guanidine, M.P. 204–205° C. (dec.).

*Analysis.*—Calculated for $C_8H_{10}ClN_7O_2$: C, 35.36; H, 3.71; N, 36.09. Found: C; 35.10: H, 4.05; N, 36.48.

*Step D: Preparation of (3 - amino - 6 - chloropyrazinamido)guanidine hydrochloride.*—The (3 - acetamido-6-chloropyrazinamido)guanidine is taken up in 150 ml. of 5% hydrochloric acid, and warmed on a steam bath for 15 minutes. After cooling to room temperature, the solution is made basic (to pH 12) with 10% sodium hydroxide, and finally cooled to 0° C. The yellow solid which precipitates is removed by filtration, pressed as dry as possible with a rubber dam and, finally, dried at 100° C. for 16 hours yielding 2.0 g. (30%) of (3-amino-6-chloropyrazinamido)guanidine, M.P. 333–334° C. (dec.).

This material is thoroughly mixed with 5 ml. of 10% hydrochloric acid and cooled to 0–5° C. The solid hydrochloride is filtered, washed with cold isopropyl alcohol and, finally, recrystallized from 30 ml. of 3:7 aqueous isopropyl alcohol with simultaneous clarification with Darco to give 1.8 g. (75% conversion) of (3-amino-6-chloropyrazinamido)guanidine hydrochloride, M.P. 277–278° C. (dec.).

The identity of the product of each of Examples 1, 2, 3 and 4 was established by chemical and physical methods.

Example 5

(3-AMINO-6-CHLOROPYRAZINAMIDO)GUANIDINE HYDROCHLORIDE

Sodium metal (2.3 g., 0.10 mole) is dissolved in 50 ml. of absolute ethanol and added to a solution of aminoguanidine hydrochloride, from Example 1, Step B, (12 g., 0.11 mole) in 250 ml. of absolute ethanol. Methyl 3-amino-6-bromopyrazinoate (12 g., 0.05 mole) is added and the mixture is concentrated to a volume of 100 ml. at room temperature in vacuo using a rotary evaporator. After standing at room temperature for 20 hours the yellow solid which has separated is removed by filtration, washed with 200 ml. of absolute ethanol then with 200 ml. of water and dried. The product is treated with 5 ml. of 10% hydrochloric acid and cooled to 0–5° C. to give (3-amino-6-bromopyrazinamido)guanidine hydrochloride, M.P. 270–271° C. (dec.). This yellow solid, after recrystallization from isopropyl alcohol-water (7:3), melts at 270–271° C. (dec.); yield 3.9 g. (24%).

*Analysis.*—Calculated for $C_6H_9BrClN_7O$: C, 23.21; H, 2.92; N, 31.57. Found: C, 23.11; H, 3.37; N, 31.33.

Example 6

(3-AMINO-6-IODOPYRAZINAMIDO)GUANIDINE HYDROCHLORIDE

*Step A: Preparation of methyl 3-amino - 6 - iodopyrazinoate.*—Methyl 3-aminopyrazinoate (30.6 g., 0.2 mole) is suspended in 500 ml. of water. Mercuric acetate (39.8 g., 0.125 mole) is added and the mixture stirred, heated on the steam bath while a solution of iodine (50.8 g., 0.2 mole) in warm dioxane (250 ml.) is added rapidly. The reaction mixture is stirred and heated for 40 minutes and then cooled and poured into a 15% aqueous solution of potassium iodide (600 ml.).

The solid product which precipitates is collected on a filter and recrystallized from 150 ml. of acetic acid to give 13.5 g. of methyl 3-amino-6-iodopyrazinoate, M. P. 199–201.5° C. After a second recrystallization the material melts at 200–202° C.

*Analysis.*—Calculated for $C_6H_6IN_3O_2$: C, 25.82; H, 2,17; N, 15.06; I, 45.48. Found: C, 26.18; H, 2.14; N, 14.81; I, 44.89.

*Step B: Preparation of (3-amino-6-iodopyrazinamido guanidine hydrochloride.*—Sodium metal (0.8 g., 0.035 mole) is dissolved in 25 ml. of absolute ethanol and added to a solution of aminoguanidine hydrochloride, from Example 1, Step B, (4 g., 0.036 mole) in 100 ml. of boiling absolute ethanol. This mixture is allowed to cool to room temperature and methyl 3-amino-6-iodopyrazinoate (5g., 0.018 mole) is added. The whole is evaporated to a volume of 50 ml. in vacuo at room temperature and allowed to stand overnight at room temperature. A yellow solid precipitates which is removed by filtration, washed well with ethanol and then with water. The solid is dissolved in 75 ml. of warm 2% hydrochloric acid, filtered through Darco A, and the filtrate cooled to 0–5° C. (3 - amino - 6-iodopyrazinamido)guanidine hydrochloride precipitates as a light yellow solid which is recrystallized from 3:7 aqueous isopropyl alcohol. The yield is 1.1 g. (17%), M.P. 256–257° C. (dec.).

*Analysis.*—Calculated for $C_6H_9ClIN_7O$: C, 20.15; H, 2.54; N, 27.42. Found: C, 20.17; H, 3.04; N, 27.35.

Example 7

1-(3-AMINO-6-CHLOROPYRAZINAMIDO)-3-METHYL-GUANIDINE HYDROCHLORIDE

Sodium metal (1.5 g., 0.065 mole) is dissolved in 35 ml. of absolute ethanol and added to a solution of 1-amino-3-methylguanidine hydriodide (15 g., 0.070 mole) in boiling absolute ethanol (150 ml.). The solution is cooled to room temperature and methyl 3-amino-6-chloropyrazinoate, from Example 1, Step A (7.5 g., 0.040 mole), is added. This mixture is evaporated in vacuo at room temperature to a volume of 100 ml. using a rotary evaporator. After standing at room temperature for 20 hours, the yellow solid which separates is removed by filtration, washed with 100 ml. of ethyl alcohol and then with 200 ml. of water. After drying at 100° C. for 20 hours, the product is treated with 3 ml. of 10% hydrochloric acid and cooled to 0–5° C. The 1-(3-amino-6-chloropyrazinamido) - 3-methylguanidine hydrochloride which separates is removed by filtration and recrystallized from a 7:3 mixture of isopropyl alcohol and water; M.P. 252–253° C. (dec.).

*Anaylsis.*—Calculated for $C_7H_{11}Cl_2N_7O$: C, 30.01; H, 3.96; N, 35.01. Found: C, 30.26; H, 4.13; N, 34.88.

Example 8

1-(3-AMINO-6-CHLOROPYRAZINAMIDO)-3-(2-HYDROXYETHYL)GUANIDINE HYDROCHLORIDE

*Step A: Preparation of 1-amino-3-(2-hydroxyethyl)-guanidine hydriodide.*—3 - methyl-3-thioisosemicarbazide hydriodide (23 g., 0.10 mole) is dissolved in 150 ml. of boiling absolute ethanol. To this solution 2-hydroxyethylamine (6.5 g., 0.10 mole) is added in small portions over 10 minutes. Methyl mercaptan gas is evolved vigorously during the addition. The final solution is refluxed for another 2 hours to complete the reaction and then it is cooled to room temperature to provide 1-amino-3-(2-hydroxyethyl)guanidine hydriodide.

*Step B: Preparation of 1-(3-amino-6-chloropyrazinamido)-3 - (2 - hydroxyethyl)guanidine hydrochloride.*—Sodium metal (2.1 g., 0.09 mole) is dissolved in 50 ml. of absolute ethanol and added to a solution of 1-amino-3-(2-hydroxyethyl)guanidine hydriodide (25 g., 0.10 mole) in 150 ml. of absolute ethanol. To this solution methyl 3-amino-6-chloropyrazinoate from Example 1, Step A (10 g., 0.05 mole), is added and the mixture concentrated in vacuo to a volume of 50 ml. using a rotary evaporator at room temperature. After standing overnight at room temperature, water (50 ml.) is added and the mixture is cooled to 0–5° C. An orange solid precipitates which is removed by filtration and washed well with water. The solid is dissolved in 20 ml. of 10% hydrochloric acid solution, clarified with Darco A, made basic by adding 10% sodium hydroxide solution and cooled to 0–5° C. The product precipitates as a yellow solid, which is then treated with 2 ml. of 10% hydrochloric acid solution and the resulting mixture is cooled to 0–5° C. The solid is removed by filtration and recrystallized from 3:7 aqueous isopropyl alcohol, giving 1-(3-amino-6 - chloropyrazinamido)-3-(2-hydroxyethyl)-guanidine hydrochloride, M.P. 243–4° C. (dec.).

*Analysis.*—Calculated for $C_8H_{13}Cl_2N_7O_2$: C, 30.98; H, 4.22; N, 31.62. Found: C, 30.97; H, 4.27; N, 31.52.

*Example 9*

1-(3-AMINO-6-CHLOROPYRAZINAMIDO)-3,3-DIMETHYL-GUANIDINE HYDROCHLORIDE

*Step A: Preparation of 1,1-dimethyl-2-benzyl-2-thiopseudourea hydrochloride.*—1,1-dimethylthiourea (18 g., 0.17 mole) is dissolved in 175 ml. of warm absolute ethanol. Benzyl chloride (23 g., 0.18 mole) is added in small portions over 15 minutes with stirring and the resulting solution refluxed for one hour and then cooled to room temperature. Approximately 500 ml. of absolute ethyl ether is added and the solution then cooled to 0–5° C. 1,1-dimethyl-2-benzyl-2-thiopseudourea hydrochloride precipitates as a white solid; yield 35.5 g. (89%), M.P. 171–172.5° C.

*Analysis.*—Calculated for $C_{10}H_{15}ClN_2S$: C, 52.04; H, 6.55; N, 12.14. Found: C, 52.03; H, 6.26; N, 11.99.

*Step B: Preparation of 1-(3-amino-6-chloropyrazinamido)-3,3 - dimethylguanidine hydrochloride.*—Sodium metal (2.3 g., 0.1 mole) is dissolved in 50 ml. of absolute methanol. The excess methanol is removed by distillation in vacuo leaving a white residue of sodium methoxide. To this is added a solution of 1,1-dimethyl-2-benzyl-2-thiopseudourea hydrochloride (23 g., 0.10 mole) in dimethyl sulfoxide (100 ml.) and the mixture heated on steam and stirred until a clear solution results. To this solution is added 3-amino-6-chloropyrazinoic acid hydrazide, from Example 2, Step A (9.4 g., 0.05 mole), and the mixture heated on steam under anhydrous conditions 16 hours. The dimethyl sulfoxide is distilled from the reaction mixture by heating on the steam bath at 1 mm. pressure. The residue is dissolved in 200 ml. of hot 2% hydrochloric acid, clarified with Darco and cooled to 0–5° C. to give 1-(3-amino-6-chloropyrazinamido)-3,3-dimethylguanidine hydrochloride in the form of a light yellow solid. After recrystallization from an isopropyl alcohol-water mixture the yield of product is 3.7 g. (25%) M.P. 279–280° C.

*Analysis.*—Calculated for $C_8H_{13}Cl_2N_7O$: C, 32.66; H, 4.45; N, 33.34. Found: C, 32.75; H, 4.44; N, 33.13.

*Example 10*

1-(3-AMINO-6-CHLOROPYRAZINAMIDO)-3-PHENYL-GUANIDINE HYDROCHLORIDE

Under anhydrous conditions, sodium metal (1.1 g., 0.048 mole) is dissolved in 25 ml. of absolute ethanol and added to a solution of 1-amino-3-phenylguanidine hydriodide (13 g., 0.050 mole) in 150 ml. of absolute ethanol. To this solution is added methyl 3-amino-6-chloropyrazinoate, from Example 1, Step A (5.7 g., 0.030 mole). This mixture is evaporated in vacuo at room temperature to a volume of 50 ml. using a rotary evaporator. After standing at room temperature for 60 hours, a yellow-orange solid is obtained which is removed by filtration, washed with 300 ml. of absolute ethanol and then with 500 ml. of water. Finally, the solid is dissolved in 250 ml. of hot 2% hydrochloric acid, clarified with Darco, cooled to room temperature and made basic with 10% sodium hydroxide. A yellow solid precipitates which is removed by filtration and dried. This product is treated with 10% hydrochloric acid (3 ml.) and cooled to 0–5° C. giving 1 - (3 - amino - 6 - chloropyrazinamido) - 3 - phenylguanidine hydrochloride as a yellow solid. After recrystallization from a mixture of isopropyl alcohol and water, the yield is 3.1 g. (30%), M.P. 254–255° C. (dec.).

*Analysis.*—Calculated for $C_{12}H_{13}Cl_2N_7O$: C, 42.24; H, 3.84; N, 28.74. Found: C, 42.22; H, 4.07; N, 28.71.

*Example 11*

1-(3-AMINO-6-CHLOROPYRAZINAMIDO)-3-AMINO-GUANIDINE HYDROCHLORIDE

Sodium metal (1.9 g., 0.083 mole) is dissolved in 50 ml. of absolute ethanol and added to a solution of 1,3-diaminoguanidine hydriodide (18.5 g., 0.085 mole) in 200 ml. of boiling absolute ethanol. The solution is cooled to room temperature and methyl 3-amino-6-chloropyrazinoate, from Example 1, Step A (8.5 g., 0.045 mole), is added, and then the mixture is evaporated at room temperature in vacuo to a volume of 100 ml. using a rotary evaporator. The mixture then is allowed to stand at room temperature for 20 hours and the yellow-orange solid which precipitates is removed by filtration, washed first with 200 ml. of cold ethanol and then with 200 ml. of water. The yellow solid is dissolved in 200 ml. of hot 5% hydrochloric acid, clarified with decolorizing charcoal, filtered and cooled to 0–5° C. to give 1 - (3 - amino - 6-chloropyrazinamido) - 3 - aminoguanidine hydrochloride in the form of light yellow needles. The product is recrystallized from an isopropyl alcohol-water mixture, yielding 2.0 g. (16%), M.P. 266–7° C. (dec.).

*Analysis.*—Calculated for $C_6H_{10}Cl_2N_8O$: C, 25.63; H, 3.59; N, 39.86. Found: C, 25.91; H, 3.64; N, 39.79.

*Example 12*

(3-AMINO-5(OR 6)-TRIFLUOROMETHYLPYRAZIN-AMIDO) GUANIDINE HYDROCHLORIDE

*Step A: Preparation of 3 - amino - 5 - (or 6-)trifluoromethylpyrazinamide.*—A mixture of 1,1,1 - trifluoro - 3,3-dibromo - 2 - propanone (97.83 g., 0.363 mole), sodium acetate trihydrate (98.60 g., 0.725 mole) and water (305 ml.) is heated, with stirring, to 100° C. over a period of 20 minutes. After maintaining the temperature at 100° C. for an additional 5 minutes, the reaction solution is immediately chilled to 0° C. in an ice bath. This solution is added to a solution of aminomalonamidamidine dihydrochloride (68.51 g., 0.363 mole) in water (720 ml.) at 0° C. in a reaction vessel where a nitrogen atmosphere is maintained. The pH of the reaction mixture is immediately adjusted to 8–9 by the addition of about 140 ml. of concentrated ammonium hydroxide. During the next 30 minutes while stirring at 5–10° C., additional concentrated ammonium hydroxide is added to maintain pH 8–9. The mixture is removed from the cooling bath and stirred at room temperature for 20 hours while maintaining a nitrogen atmosphere. The resulting yellow solid is removed by filtration, dried, extracted with boiling acetonitrile to remove an insoluble material and the acetonitrile extracts are concentrated to dryness under reduced pressure. The product is twice crystallized from acetic acid, yielding 20 g. (27%) of 3 - amino - 5(or 6)- trifluoromethylpyrazinamide, in the form of yellow solid, M.P. 195–196° C.

*Analysis.*—Calculated for $C_6H_5F_3N_4O$: C, 34.96; H, 2.44; F, 27.65; N, 27.18. Found: C, 35.39; H, 2.71; F, 27.53; N, 27.19.

*Step B: Preparation of 3 - amino - 5(or 6) - trifluoromethylpyraxinoic acid.*—Finely ground 3 - amino - 5(or 6) - trifluoromethylpyrazinamide (18.55 g., 0.09 mole) and 5% aqueous sodium hydroxide (740 ml.) are mixed and heated on a steam bath with stirring for 10 minutes. The resulting yellow solution is immediately chilled in an ice bath and made acid to Congo red test paper by the addition of 6 N hydrochloric acid. After thoroughly washing with water and drying, there is obtained 17.78 g. (95%) of 3 - amino - 5(or 6) - trifluoromethylpyrazinoic acid, in the form of a yellow solid, M.P. 185–186° C. (dec.). Recrystallization of a sample from toluene gives material with unchanged M.P.

*Analysis.*—Calculated for $C_6H_4F_3N_3O_2$: C, 34.79; H, 1.95; N, 20.29. Found: C, 35.10; H, 1.95; N, 20.23.

*Step C: Preparation of methyl 3-amino-5(or 6)-trifluoromethylpyrazinoate.*—To a solution of dry hydrogen chloride gas (495 g.) dissolved in anhydrous methanol (1650 ml.), is added finely ground 3-amino-5(or 6)-trifluoromethylpyrazinoic acid (16.57 g., 0.08 mole) and the resulting yellow solution is stirred at room temperature for 19 hours. The reaction solution is concentrated to dryness under reduced pressure and the residue treated with water (150 ml.) and, while cooling, made basic by the addition of excess saturated sodium bicarbonate solution. After thoroughly washing with water and drying, there is obtained 17.12 g. (97%) of methyl 3-amino-5(or 6)-trifluoromethylpyrazinoate in the form of a yellow solid, M.P. 194.5–196° C. One recrystallization from methanol gives the product in the form of yellow needles, M.P. 195.5–196.5° C.

*Analysis.*—Calculated for $C_7H_6F_3N_3O_2$: C, 38.02; H, 2.73; F, 25.77; N, 19.00. Found: C, 38.30; H, 2.64; F, 25.84; N, 18.91.

*Step D: Preparation of (3-amino-5(or 6)-trifluoromethylpyrazinamido)guanidine hydrochloride.*—Sodium metal (2.3 g., 0.10 mole) is dissolved in absolute ethanol (50 ml.) and added to a solution of aminoguanidine hydrochloride (11 g., 0.10 mole) in boiling absolute ethanol (200 ml.). To this solution is added methyl 3-amino-5(or 6)-trifluoromethylpyrazinoate (10.0 g., 0.05 mole). The whole is evaporated at room temperature in vacuo, to a volume of 75 ml. and finally allowed to stand at room temperature for 24 hours. A yellow solid precipitates which is removed by filtration, washed well with ethanol and water and triturated with 50 ml. of warm 3% hydrochloric acid solution. The resulting suspension is treated with Darco, filtered and the filtrate cooled and made basic with aqueous ammonia. The solid which separates is converted to the hydrochloride salt by treating with 1 ml. of 10% hydrochloric acid solution. After two recrystallizations from isopropyl alcohol the yield of (3-amino-5(or 6)-trifluoromethylpyrazinamido)guanidine hydrochloride is 0.5 g. (3.3%), M.P. 249–250° C.

*Analysis.*—Calculated for $C_7H_9ClF_3N_7O$: C, 28.06; H, 3.03; N, 32.72; F, 19.02. Found: C, 28.15; H, 3.03; N, 32.51; F, 19.07.

In this Example 12 the trifluoromethyl group is believed to be attached to the carbon atom at the 5-position of the pyrazine ring. However, further structure proof may indicate that this group is at the 6-position.

*Example 13*

1-(3-AMINO-6-CHLOROPYRAZINAMIDO)-3-PHENETHYL-GUANIDINE HYDROCHLORIDE

*Step A: Preparation of 1-amino-3-phenylethylguanidine hydriodide.*—Phenethylamine (6.7 g., 0.055 mole) is dissolved in 15 ml. of absolute ethanol and added slowly to a solution of 3-methyl-3-thioisosemicarbazide hydriodide (12 g., 0.052 mole) in 35 ml. of boiling absolute ethanol. The solution is refluxed for 12 hours; during this time methyl mercaptan is evolved. The 1-amino-3-phenethylguanidine hydriodide is used directly in the next step without further purification.

*Step B: Preparation of 1-(3-amino-6-chloropyrazinamido)-3-phenethylguanidine hydrochloride.* — Sodium metal (1.1 g., 0.05 mole) is dissolved in 25 ml. of boiling absolute ethanol and added to a solution of 1-amino-3-phenethylguanidine hydriodide (15 g., 0.05 mole) in 50 ml. of boiling absolute ethanol. Methyl 3-amino-6-chloropyrazinoate (6.6 g., 0.035 mole) from Example 1, Step A, is added to this solution and the solvent evaporated on a rotary evaporator until a final volume of 25 ml. is obtained. This mixture is cooled to room temperature and allowed to stand for 16 hours. A yellow solid precipitates which is removed by filtration, washed well with 50 ml. of absolute ethanol and 50 ml. of cold water and then dissolved in 50 ml. of hot 2% hydrochloric acid. The solution is clarified with Darco A, filtered, cooled to room temperature and made basic with 10% sodium hydroxide. The resulting solid is taken up in 20 ml. of boiling 3:7 aqueous isopropyl alcohol to which 1 drop of 10% hydrochloric acid had been added. The solution is clarified with Darco A, filtered, and cooled to 0–5° C., whereupon 1-(3-amino-6-chloropyrazinamido)-3-phenethylguanidine hydrochloride precipitates as a yellow solid, M.P. 248–249° C. (dec.).

*Analysis.*—Calculated for $C_{14}H_{17}Cl_2N_7O$: C, 45.41; H, 4.63; N, 26.48. Found: C, 45.48; H, 4.56; N, 26.66.

*Example 14*

1-(3-AMINO-6-CHLOROPYRAZINAMIDO)-3-BENZYL-GUANIDINE HYDROCHLORIDE

By replacing the phenethylamine employed in Example 13, Step A, by an equimolecular quantity of benzylamine, and following substantially the same procedure described in Step A of Example 13, there is obtained 1-amino-3-benzylguanidine hydriodide. This product then is treated with methyl 3-amino-6-chloropyrazinoate by essentially the same method described in Step B of Example 13 to give 1 - (3 - amino-6-chloropyrazinamido)-3-benzylguanidine hydrochloride, M.P. 242–245° C. (dec.).

*Analysis.*—Calculated for $C_{13}H_{15}Cl_2N_7O$: C, 43.83; H, 4.25; N, 27.53. Found: C, 43.81; H, 4.41; N, 27.34.

*Example 15*

(3-AMINOPYRAZINAMIDO)GUANIDINE HYDROCHLORIDE

A solution of sodium methoxide in absolute methyl alcohol is prepared by dissolving sodium metal (4.6 g., 0.20 mole) in absolute methyl alcohol (50 ml.). This solution is added to a solution of aminoguanidine hydrochloride (24.0 g., 0.22 mole) in boiling absolute methyl alcohol (300 ml.). To the hot mixture is added methyl 3-aminopyrazinoate (15.3 g., 0.10 mole), and the mixture then is evaporated to a volume of 100 ml. in vacuo and allowed to stand at room temperature 24 hours. This gives a yellow solid which is washed well with methyl alcohol and then with water, and dissolved in warm 2% hydrochloric acid (150 ml.). The solution is filtered through decolorizing carbon (Norite), cooled, and made basic with concentrated ammonium hydroxide. A yellow solid precipitates which is removed by filtration, dissolved in concentrated hydrochloric acid (10 ml.) and cooled to 0–5° C. (3 - aminopyrazinamido)guanidine hydrochloride precipitates as a yellow solid. It is recrystallized from a mixture of isopropyl alcohol (20 ml.) and water (10 ml.) to yield 8.2 g. (36%) of product, M.P. 288.5–290° C. (dec.).

*Analysis.*—Calculated for $C_6H_{10}ClN_7O$: C, 31.11; H, 4.35; N, 42.33. Found: C, 31.30; H, 4.51; N, 42.15.

Example 16

(3,5-DIAMINO-6-CHLOROPYRAZINAMIDO) GUANIDINE

*Step A: Preparation of methyl 3-amino-5,6-dichloropyrazinoate.*—Methyl 3-amino-pyrazinoate (765 g., 5 moles) is suspended in 5 liters of dry benzene. While stirring under anhydrous conditions, sulfuryl chloride (1.99 liters, 3318 g., 24.58 moles) is added over a period of 30 minutes and stirring is continued for 1 hour. During this period, the temperature rises to about 50° C. and then begins to drop. The mixture is heated cautiously to reflux (60° C.), refluxed for 5 hours and then stirred over night at room temperature. The excess sulfuryl chloride is removed by distillation at atmospheric pressure (distillation is stopped when vapor temperature reaches 78° C.). The dark red mixture is chilled to 6° C. The crystals are removed by filtration, washed by displacement with cold (8° C.) benzene (two 100 ml. portions), then washed with petroleum ether (300 ml.) and dried in vacuo at room temperature, yielding 888 g. (80%) of methyl 3-amino-5,6-dichloropyrazinoate in the form of red crystals, M.P. 228–230° C. The crude product is dissolved in boiling acetonitrile (56 liters) and passed through a heated (70–80° C.) column of decolorizing charcoal (444 g.). The column is washed with hot acetonitrile (25 liters) the combined eluate concentrated in vacuo to about 6 liters and chilled to 5° C. The crystals that form are removed by filtration, washed three times with cold acetonitrile, and air dried to constant weight. The yield is 724 g. (82% recovery, 66% overall) of methyl 3-amino-5,6-dichloropyrazinoate in the form of yellow crystals, M.P. 230–234° C. After additional recrystallizations from acetonitrile the product melts at 233–234° C.

*Analysis.*—Calculated for $C_6H_5Cl_2N_3O_2$: C, 32.46; H, 2.27; N, 18.93; Cl, 31.94. Found: C, 32.83; H, 2.35; N, 19.12; Cl, 31.94.

*Step B: Preparation of methyl 3,5-diamino-6-chloropyrazinoate.*—In a 2-liter, 3-necked flask fitted with a mechanical stirrer, thermometer and gas inlet tube is placed dry dimethyl sulfoxide (1 liter). Methyl 3-amino-5,6-dichloropyrazinoate (100 g., 0.45 mole) is added and the mixture stirred and heated at 65° C. on a steam bath until solution is effected. A stream of dry ammonia gas is admitted to the solution, with continuous stirring, over a period of 45 minutes while the temperature is maintained at 65–70° C. The solution is cooled to about 10° C. with continuous stirring and ammonia gas is admitted for an additional 1¼ hours. The yellow reaction mixture is poured, with stirring, into cold water (2 liters) and the light yellow solid that separates is removed by filtration and thoroughly washed with water, and dried in a vacuum desiccator, to give 82.5 g. (91%) of methyl 3,5-diamino-6-chloropyrazinoate, M.P. 210–212° C. Recrystallization from acetonitrile gives material melting at 212–213° C.

*Analysis.*—Calculated for $C_6H_7ClN_4O_2$: C, 35.57; H, 3.48; N, 27.65. Found: C, 35.80; H, 3.38; N, 28.01.

*Step C: Preparation of (3,5-diamino-6-chloropyrazinamido)guanidine.*—A solution of sodium ethoxide (0.10 mole) in ethyl alcohol is prepared by dissolving sodium metal (2.3 g., 0.10 mole) in absolute ethyl alcohol (100 ml.). This solution is added dropwise over one hour to a stirred, refluxing solution of aminoguanidine hydrochloride (11.1 g., 0.10 mole) and methyl 3,5-diamino-6-chloropyrazinoate (10.0 g., 0.05 mole) in absolute ethyl alcohol (500 ml.) in a 1 liter, three-necked, round bottom flask fitted with a mechanical stirrer, a reflux condenser with drying tube and a dropping funnel. After the addition is complete, the mixture is stirred and refluxed for twenty-two hours. Finally, the mixture is cooled to 0–5° C. A yellow solid precipitates which is removed by filtration. This material is purified by dissolving in warm 10% hydrochloric acid (25 ml.), filtering twice through decolorizing carbon (Norite) and reprecipitating by making the filtrate basic with dilute sodium hydroxide. A yield of 1.4 g. (12%) of (3,5-diamino-6-chloropyrazinamido)guanidine precipitates as a yellow solid, M.P. 281–282° C. (dec.).

*Analysis.*—Calculated for $C_6H_9ClN_8O$: C, 29.45; H, 3.71; N, 45.81. Found: C, 29.46; H, 3.96; N, 45.96.

Example 17

(3-AMINO-5-DIMETHYLAMINO-6-CHLOROPYRAZINAMIDO) GUANIDINE

*Step A: Preparation of methyl 3-amino-5-dimethylamino-6-chloropyrazinoate.*—In a 5-liter, 3-necked flask equipped with a mechanical stirrer and reflux condenser protected with a drying tube is placed methyl 3-amino-5,6-dichloropyrazinoate (178 g., 0.8 mole) (from Example 16, Step A) and isopropyl alcohol (1.1 liters). While stirring, the suspension is treated with dimethylamine (200 g., 4.44 mole) in isopropyl alcohol (2 liters) and the mixture then is refluxed for one hour. The solution is cooled in an ice bath and the crystalline product that separates is removed by filtration and dried. The yield of methyl 3-amino-5-dimethylamino-6-chloropyrazinoate is 177.2 g. (97%), M.P. 145–146.5° C. Recrystallization from methanol gives material melting at 145.5–146.5° C.

*Analysis.*—Calculated for $C_8H_{11}ClN_4O_2$: C, 41.66; H, 4.81; N, 24.29. Found: C, 41.73; H, 4.52; N, 24.24.

*Step B: Preparation of (3-amino-5-dimethylamino-6-chloropyrazinamido)guanidine.*—A 500 ml. round-bottomed flask fitted with a stirrer, nitrogen inlet tube and water cooled condenser equipped with a calcium chloride tube is charged with anhydrous methanol (200 ml.) and metallic sodium (4.6 g.). When the reaction is complete, aminoguanidine hydrochloride (24 g., 0.218 mole) is added and the mixture is heated at reflux for five minutes. To the reaction mixture is added methyl 3-amino-5-dimethylamino-6-chloropyrazinoate (14.6 g., 0.063 mole) and heating is continued for fifty minutes. The reaction mixture is concentrated by distillation at reduced pressure to a volume of 50 ml. and then refrigerated under nitrogen overnight. The product that separates is removed by filtration, washed while on the filter funnel wtih methanol and then with water and finally dissolved in 200 ml. of water containing sufficient hydrochloric acid to effect solution. After filtration, the product is precipitated from the filtrate by the addition of 5% aqueous sodium hydroxide until pH reaches 9. The solid is dried and washed with warm acetonitrile to give 5.5 g. (32%) of (3-amino-5-dimethylamino-6-chloropyrazinamido)guanidine, M.P. 221° C.

*Analysis.*—Calculated for $C_8H_{13}ClN_8O$: C, 35.23; H, 4.80; N, 41.09; Cl, 13.00. Found: C, 34.73; H, 4.87; N, 41.36; Cl, 13.08.

Example 18

(3-AMINO-5-ALLYLAMINO-6-CHLOROPYRAZINAMIDO) GUANIDINE HYDROCHLORIDE

*Step A: Preparation of methyl 3-amino-5-allylamino-6-chloropyrazinoate.*—By following the procedure described in Example 17, Step A, but replacing the dimethylamine with an equimolecular quantity of allylamine and refluxing for one-half hour, there is obtained a 69% yield of methyl 3-amino-5-allylamino-6-chloropyrazinoate, which after recrystallization in 2-propanol melts at 105–106.5° C.

*Analysis.*—Calculated for $C_9H_{11}ClN_4O_2$: C, 44.54; H, 4.57; N, 23.09. Found: C, 44.46; H, 4.61; N, 23.12.

*Step B: Preparation of (3-amino-5-allylamino-6-chloropyrazinamido)guanidine hydrochloride.*—A solution of sodium ethoxide (0.117 mole) in absolute ethyl alcohol is prepared by dissolving sodium metal (2.70 g., 0.117 mole) in absolute ethyl alcohol (100 ml.). This solution is added dropwise to a refluxing solution of aminoguanidine hydrochloride (13.3 g., 0.12 mole) and methyl 3-amino-5-allylamino-6-chloropyrazinoate (15.0 g., 0.062 mole) in absolute ethyl alcohol (400 ml.) in a 1 liter, three-necked, round-bottom flask fitted with a mechanical stirrer, a reflux condenser with drying tube and a dropping funnel. When the addition is complete, the mixture is stirred and refluxed for twenty hours. Finally the solution is filtered and concentrated at reduced pressure until very little solvent remains. The residual material is treated with 10% hydrochloric acid (5 ml.) and cooled to 0–5° C. The yellow solid that separates is recrystallized from a mixture of water (6 ml.) and isopropyl alcohol (20 ml.), giving 2.0 g. (10%) of (3-amino-5-allylamino-6-chloropyrazinamido)guanidine hydrochloride, M.P. 182–183° C. (dec.).

Analysis.—Calculated for $C_9H_{14}Cl_2N_8O$: C, 33.65; H, 4.39; N, 34.89. Found: C, 33.57; H, 4.34; N, 35.14.

Example 19

(3-AMINO-5-ISOPROPYLAMINO-6-CHLOROPYRAZIN-AMIDO)GUANIDINE HYDROCHLORIDE

Step A: Preparation of methyl 3-amino-5-isopropylamino-6-chloropyrazinoate.—By following the procedure described in Example 17, Step A, but replacing the dimethylamine with an equimolecular quantity of isopropylamine and refluxing for ¾ hour, there is obtained a 70% yield of methyl 3-amino-5-isopropylamino-6-chloropyrazinoate which, after recrystallization from 2-propanol melts at 125.5–126.5° C.

Analysis.—Calculated for $C_9H_{13}ClN_4O_2$: C, 44.18; H, 5.36; N, 22.90. Found: C, 43.82; H, 5.18; N, 22.62.

Step B: Preparation of (3-amino-5-isopropylamino-6-chloropyrazinamido)guanidine hydrochloride.—A 500 ml. round-bottom flask fitted with a stirrer, nitrogen inlet tube and water-cooled condenser equipped with a drying tube is charged with anhydrous methanol (250 ml.) and metallic sodium (4.6 g., 0.20 g. atoms). When the reaction is complete, aminoguanidine hydrochloride (24 g., 0.218 mole) is added. Then the mixture is heated to reflux for five minutes, cooled and filtered to remove the sodium chloride. The filtrate is treated with methyl 3-amino-5-isopropylamino-6-chloropyrazinoate (12.3 g., 0.05 mole), heated one hour at reflux, concentrated to 50 ml. in vacuo and refrigerated overnight. The product that separates is removed by filtration and purified by dissolving in dilute hydrochloric acid and reprecipitating with dilute sodium hydroxide. The solid (5.5 g., 38%) is dissolved in a minimum volume of warm dilute hydrochloric acid and then filtered. Upon cooling, (3-amino-5-isopropylamino-6-chloropyrazinamido)guanidine hydrochloride separates, M.P. 229–231° C.

Analysis.—Calculated for $C_9H_{15}ClN_8O \cdot HCl$: C, 33.45; H, 4.68; N, 34.67; Cl, 21.94. Found: C, 33.30; H, 4.82; N, 34.87; Cl, 21.86.

Example 20

(3,5-DIAMINO-6-BROMOPYRAZINAMIDO) GUANIDINE

Step A: Preparation of methyl 3,5-diaminopyrazinoate.—A mixture of methyl 3,5-diamino-6-chloropyrazinoate, from Example 16, Step B (14.2 g., 0.07 mole), 5% palladium on charcoal catalyst (9 g.), magnesium oxide (4.0 g., 0.1 mole), and methanol (250 ml.) is shaken with hydrogen for 18 hours at room temperature and at an initial hydrogen pressure of 30 p.s.i. The pressure drop indicates that 0.07 mole of hydrogen has been absorbed. The mixture is filtered, and the solids extracted with a boiling solution of 2-propanol (500 ml.) and water (250 ml.). The methanol filtrate and the extract solution are combined and concentrated by distillation in vacuo to a volume of 100 ml. The methyl 3,5-diaminopyrazinoate that precipitates weighs 10.0 g. (85%), M.P. 247–250° C. (dec.). Recrystallization from aqueous 2-propanol gives material that melts at 252–254° C. (dec.).

Analysis.—Calculated for $C_6H_8N_4O_2$: C, 42.85; H, 4.80; N, 33.32. Found: C, 43.15; H, 4.76; N, 33.11.

Step B: Preparation of methyl 3,5-diamino-6-bromopyrazinoate.—A solution of bromine (2.1 g., 0.013 mole) in acetic acid (10 ml.) is added to a suspension of methyl 3,5-diaminopyrazinoate (2.0 g. 0.012 mole) in acetic acid (25 ml.) at 50° C. After standing 10 minutes, the crystalline product is collected and recrystallized from 2-propanol to give 1.2 g. of methyl 3,5-diamino-6-bromopyrazinoate, M.P. 217–219° C.

Analysis.—Calculated for $C_6H_7BrN_4O_2$: C, 29.17; H, 2.86; N, 22.68. Found: C, 29.51; H, 3.02; N, 22.56.

Step C. Preparation of (3,5 - diamino-6-bromopyrazinamido)guanidine.—By replacing the methyl 3,5-diamino-6-chloropyrazinoate employed in Example 16, Step C, by an equimolecular quantity of methyl 3,5-diamino-6-bromopyrazinoate, and following substantially the same procedure described in Example 16, Step C, there is obtained (3,5-diamino-6 - bromopyrazinamido) guanidine.

Example 21

(3,5-DIAMINO-6-IODOPYRAZINAMIDO)GUANIDINE

Step A: Preparation of Methyl 3,5-diamino-6-iodopyrazinoate.—A suspension of methyl 3,5-diaminopyrazinoate (1.7 g., 0.01 mole) from Example 20, Step A, in water (30 ml.) is heated to 70° C., and mercuric acetate (3.2 g., 0.01 mole) and a solution of iodine (2.5 g., 0.01 mole) in warm dioxane (20 ml.) are added quickly. The mixture is stirred and heated for 5 minutes on the steam bath, then allowed to cool to room temperature and a 15% aqueous solution of potassium iodide (50 ml.) is added. The resulting red solution quickly deposits a crystalline product which is collected by filtration and recrystallization from a 2-propanol - dimethylformamide mixture of yield 1.2 g. of methyl 3,5-diamino-6-iodopyrazinoate, M.P. 200–202° C.

Analysis.—Calculated for $C_6H_7IN_4O_2$: C, 24.50; H, 2.40; N, 19.05: Found: C, 24.91; H, 2.73; N, 18.73.

Step B: Preparation of (3,5-diamino-6-iodopyrazinamido)guanidine.—By replacing the methyl 3,5-diamino-6-chloropyrazinoate employed in Example 16, Step C, by an equimolecular quantity of methyl 3,5-diamino-6-iodopyrazinoate and following substantially the same procedure described in Example 16, Step C, there is obtained (3,5-diamino-6-iodopyrazinamido)guanidine.

Other methyl 3-amino-5-substituted-amino-6 - chloropyrazinoates prepared by substantially the same process described in Example 16, Step A, are identified in Table I. In each instance the dimethylamine of Example 16, Step A is replaced by an amine of the type $R^5R^6NH$ and allowed to react with methyl 3-amino-5,6-dichloropyrazinoate as shown below

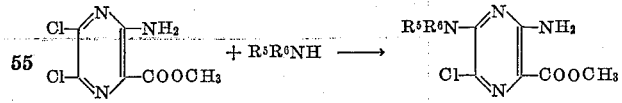

The radicals $R^5$ and $R^6$ in the starting amine in each instance are retained in the end product and are identified in columns 2 and 3 of Table I. The molar ratio of the reactants are usually the same as in Example 16, that is, a ratio of one mole of ester to 5 moles of amine. However, the reaction can be carried out with as little as 2 moles of amine. The reactants and reaction times as well as data concerning each product, that is, crystallization solvent, yield, melting point and elementary analysis are presented in the table. All other reaction conditions are approximately as described in Example 16, Step A unless otherwise specified.

For the sake of convenience, the example numbers used in Table I follow the preceding numbers in consecutive order, even though the table describes only the preparation of intermediates which are then employed in making the novel (3,5-diamino-6-chloropyrazinamido) guanidines identified in Table II.

TABLE I

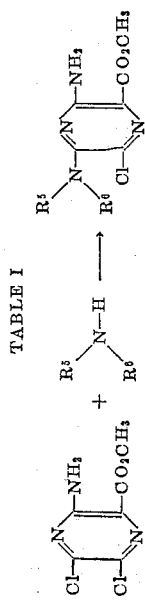

| Ex. No. | R⁵ | R⁶ | Reaction Time in hours | Crystallization Solvent | Yield, Percent | M.P., °C. | Empirical Formula | End Product | | Analysis | | |
|---|---|---|---|---|---|---|---|---|---|---|---|---|
| | | | | | | | | | | C | H | N |
| 22 | $CH_3(CH_2)_4$ | H | ¾ | Cyclohexane | 72 | 100.5–102.5 | $C_{11}H_{17}ClN_4O_2$ | Calc | | 44.48 | 6.28 | 20.54 |
| | | | | | | | | Found | | 48.27 | 6.09 | 20.45 |
| 23 | ⌬-$CH_2$ | H | ½ | 2-propanol | 78 | 132–133 | $C_{10}H_{13}ClN_4O_2$ | Calc | | 46.78 | 5.10 | 21.83 |
| | | | | | | | | Found | | 46.93 | 5.18 | 21.92 |
| 24 | ⌬H | H | 1 | ...do... | 98 | 167–169 | $C_9H_{11}ClN_4O_2$ | Calc | | 44.54 | 4.57 | 23.09 |
| | | | | | | | | Found | | 44.63 | 4.52 | 23.09 |
| 25 | ⌬H | H | ¼ | ...do... | 93 | 119.5–121.5 | $C_{11}H_{15}ClN_4O_2$ | Calc | | 48.80 | 5.58 | 20.70 |
| | | | | | | | | Found | | 48.91 | 5.39 | 20.59 |
| 26 | ⌬-$CH_2$ | H | (*) | Methanol | 64 | 157–158 | $C_{13}H_{13}ClN_4O_2$ | Calc | | 53.34 | 4.48 | 19.14 |
| | | | | | | | | Found | | 53.46 | 4.46 | 19.22 |
| 27 | $CH_3$-⌬-$CH_2$ | H | 1 | 2-propanol | 66 | 112.5–114.5 | $C_{14}H_{15}ClN_4O_2$ | Calc | | 54.81 | 4.93 | 18.27 |
| | | | | | | | | Found | | 55.24 | 4.99 | 18.20 |
| 28 | Cl-⌬-$CH_2$ | H | 1 | Triturate with hot water | 93 | 136–137 | $C_{13}H_{12}Cl_2N_4O_2$ | Compound used in next step without purification | | | | |
| 29 | $CF_3CH_2$ | H | Sealed tube 72 | ...do... | 97 | 153–154 | $C_8H_8N_4ClF_3O_2$ | Calc | | 33.76 | 2.83 | 19.69 |
| | | | | | | | | Found | | 34.10 | 3.08 | 19.57 |
| 30 | $HOCH_2CH_2$ | H | 1 | 2-propanol | 100 | 165–157 | $C_8H_{11}ClN_4O_3$ | Compound used in next step without purification | | | | |
| 31 | $H_2NCH_2CH_2$ | H | ⅓ | Methanol | 96 | 265 | $C_8H_{12}ClN_5O_2 \cdot HCl$ | Calc | | 34.05 | 4.64 | 24.82 |
| | | | | | | | | Found | | 35.12 | 4.56 | 24.61 |
| 32 | $(CH_3)_2NCH_2CH_2$ | H | 1 | ...do... | 40 | 257 | $C_{10}H_{16}ClN_5O_2 \cdot HCl$ | Calc | | 38.72 | 5.52 | 22.58 |
| | | | | | | | | Found | | 39.25 | 5.55 | 22.33 |
| 33 | N⌬-$CH_2$ | H | ½ | Dissolve in acid, precipitate with base | 69 | 95–97 | $C_{12}H_{12}ClN_5O_2$ | Calc | | 49.07 | 4.12 | 23.85 |
| | | | | | | | | Found | | 48.66 | 5.03 | 23.35 |
| 34 | O⌬-CH | H | 1 | 2-propanol | 81 | 148–149 | $C_{11}H_{11}ClN_4O_3$ | Calc | | 46.73 | 3.92 | 19.82 |
| | | | | | | | | Found | | 46.14 | 4.08 | 19.57 |
| 35 | $CH_3$ | $C_2H_5$ | ½ | ...do... | 73 | 102–104 | $C_9H_{13}ClN_4O_2$ | Calc | | 44.18 | 5.36 | 22.90 |
| | | | | | | | | Found | | 44.16 | 5.24 | 22.81 |

TABLE I—Continued

| Ex. No. | R⁵ | R⁶ | Reaction Time in hours | Crystallization Solvent | Yield, Percent | M.P., °C. | End Product Empirical Formula | | Analysis | | |
|---|---|---|---|---|---|---|---|---|---|---|---|
| | | | | | | | | | C | H | N |
| 36 | C₂H₅ | CH₂=CHCH₂ | 1 | | | Compound used in next step without purification | | | | | |
| 37 | CH₃O | CH₃ | 6 | do | 68 | 144–146 | C₈H₁₁ClN₄O₃ | Calc. Found | 38.95 38.41 | 4.50 4.33 | 22.72 22.50 |
| 38 | ① H | | ½ | do | 95 | 168–171 | C₁₀H₁₃ClN₄O₂ | Calc. Found | 46.78 47.01 | 5.10 4.95 | 21.83 21.86 |
| 39 | ② H | | ¼ | do | 75 | 109–111 | C₁₂H₁₇ClN₄O₂ | Calc. Found | 50.61 50.54 | 6.02 5.79 | 19.68 19.60 |
| 40 | ③ CH₃—N⟩ H | | 20 | do | 88 | 186–188 | C₁₁H₁₆ClN₅O₂ | Calc. Found | 46.23 46.36 | 5.64 5.49 | 24.51 24.02 |

*The reaction is run without a solvent using a large excess of amine and heating 30 seconds on a steam bath. ① 1-pyrrolidinyl radical. ② Hexahydro-1-azapinyl radical. ③ 4-methyl-1-piperazinyl radical.

Each of the methyl 3,5-diamino-6-chloropyrazinoate compounds in Table I will react with aminoguanidine to give the corresponding (3,5-diamino-6-chloropyrazinamido)guanidine by the procedure described in Example I, Step C. In each instance the methyl 3-amino-6-chloropyrazinoate employed in Example 1, Step C, is replaced by a methyl 3,5-diaminopyrazinoate having the structure

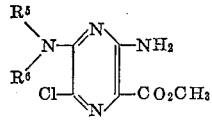

which is allowed to react with aminoguanidine by substantially the same procedure there described, including the subsequent isolation to form the end product having the structure

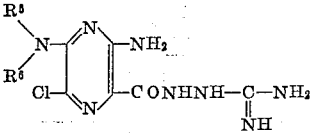

The radicals $R^5$ and $R^6$ in the starting pyrazinoate in each case are retained unchanged in the pyrazinamidoguanidine end product and are identified in colums 2 and 3 of Table II. While the methyl 3,5-diaminopyrazinoate and the aminoguanidine hydrochloride reactants generally are employed in the same molar proportions used in Example 1, Step C, this ratio is not critical and can be varied over a rather broad range. All other conditions of the reaction are essentially as described in Example 1, Step C.

TABLE II

| Ex. No. | R⁵ | R⁶ | Pyrazinoate from Ex. No. |
|---|---|---|---|
| 41 | CH₃(CH₂)₄— | H | 22 |
| 42 | ▷—CH₂— | H | 23 |
| 43 | ▷— | H | 24 |
| 44 | ⟨H⟩— | H | 25 |
| 45 | ⟨⟩—CH₂— | H | 26 |
| 46 | CH₃—⟨⟩—CH₂— | H | 27 |
| 47 | Cl—⟨⟩—CH₂— | H | 28 |
| 48 | CF₃CH₂— | H | 29 |
| 95 | HOCH₂CH₂— | H | 30 |
| 42 | H₂NCH₂CH₂— | H | 31 |
| 50 | (CH₃)₂NCH₂CH₂— | H | 32 |
| 51 | N⟨⟩—CH₂— | H | 33 |

TABLE II—Continued

| Ex. No. | R⁵ | R⁶ | Pyrazinoate from Ex. No. |
|---|---|---|---|
| 53 | furfuryl (O-CH₂-) | H | 34 |
| 54 | CH₃— | C₂H₅ | 35 |
| 55 | C₂H₅— | CH₂=CHCH₂ | 36 |
| 56 | CH₃ | CH₃O— | 37 |
| 57 | ⟨H⟩① | | 38 |
| 58 | ⟨H⟩② | | 39 |
| 59 | CH₃—N⟨H⟩③ | | 40 |

① 1-pyrrolidinyl radical.
② Hexahydro-1-azepinyl radical.
③ 4-methyl-1-piperazinyl radical.

The products of this invention can be administered to man and animals in unit dosage form in pills, tablets, capsules, injectable preparations and the like as in conventional pharmaceutical practice. It will be appreciated that the dosage of each individual compound will vary over a wide range depending upon the relative potency of the selected compound and also depending upon the age and weight of the particular patient to be treated and upon the particular ailment to be treated. For these reasons, tablets, pills, capsules and the like containing for example from 5 to 500 mgs. or more or less active ingredient can be made available for the symptomatic adjustment of the dosage to the individual patient. The compounds of this invention can be administered either alone or combined with other therapeutic agents advantageously at a dosage range of from 5 mg./day to about 1000 mg./day or at a somewhat higher or lower dosage at the physician's discretion, preferably on a 1 to 3 times a day regimen.

Each of the compounds of this invention can be incorporated in a dosage form similar to that described in the following example, or any other of the usual dosage forms suitable for oral parenteral administration, which can be prepared by well known methods.

*Example 60*

DRY FILLED CAPSULE CONTAINING 50 MG. OF ACTIVE INGREDIENT

Per capsule, mg.
(3 - amino-6-chloropyrazinamido)guanidine hydrochloride _____ 100
Lactose _____ 223
Magnesium stearate _____ 2

Mixed powders _____ 325

Mix the (3-amino-6-chloropyrazinamido)guanidine hydrochloride, lactose, and magnesium stearate and reduce to a No. 60 mesh powder. Encapsulate, filling 325 mg. in each No. 2 capsule.

It is also contemplated to combine the compounds of this invention with other hypotensive agents or with other therapeutic agents.

While the above examples describe the preparation of certain compounds which are illustrative of the novel compounds of this invention and certain specific dosage forms suitable for administering the novel compounds, it is to be understood that the invention is not be limited to the specific compounds described in the examples or by the specific reaction conditions described for the preparation of these compounds or by the specific ingredients included in the pharmaceutical preparations, but is to be understood to embrace variations and modifications thereof which fall within the scope of the appended claims.

What is claimed is:

1. (3-amino-5-R¹-6-R-pyrazinamido)guanidine wherein
   R is selected from the group consisting of hydrogen, halogen, trihalomethyl and
   R¹ is selected from the group consisting of hydrogen and amino.

2. (3,5-diamino-6-halopyrazinamido)guanidine.

3. A compound selected from the group consisting of a product having the structure

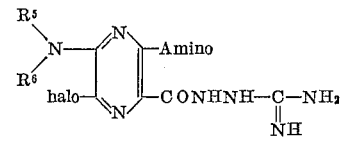

and pharmaceutically acceptable salts thereof wherein
   R⁵ is selected from the group consisting of
      hydrogen,
      lower alkyl, and
      lower alkenyl; and
   R⁶ is selected from the group consisting of
      hydrogen,
      lower-alkyl,
      lower-cycloalkyl,
      hydroxy-lower-alkyl,
      halo-lower-alkyl,
      lower-(cycloalkylalkyl),
      phenyl-lower-alkyl,
      lower-(alkylphenalkyl),
      halophenyl-lower-alkyl,
      lower alkoxy,
      furyl-lower-alkyl,
      pyridyl-lower-alkyl,
      amino-lower-alkyl, and
      lower-(alkylaminoalkyl-; and
   R⁵ and R⁶ can be linked together to form, with the nitrogen atom to which they are attached a heterocyclic structure selected from the group consisting of
      1-pyrrolidinyl,
      hexahydro-1-azepinyl and
      4-methyl-1-piperizinyl.

4. [3 - amino-5-(lower-alkylamino)-6-halopyrazinamido]guanidine.

5. (3 - amino-5-isopropylamino-7-chloropyrazinamido)guanidine.

6. (3 - amino-5-allylamino-6-chloropyrazinamido)guanidine.

7. (3,5-diamino-6-chloropyrazinamido)guanidine.

8. (3 - amino-5-[(di-lower-alkyl)amino]-6-halopyrazinamido)guanidine.

9. (3 - amino-5-dimethylamino-6-chloropyrazinamido)guanidine.

10. (3-aminopyrazinamido)guanidine.

11. (3-amino-6-halopyrazinamido)guanidine.

12. A compound having the structure

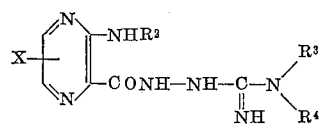

in which R² is selected from the group consisting of hydrogen and lower alkanoyl, R³ and R⁴ respectively is selected from the group consisting of hydrogen, lower alkyl, hydroxy-lower alkyl, phenyl, phenyl-lower-alkyl, amino, and together with the nitrogen to which they are attached a member selected from the group consisting of 1-pyrrolidinyl, piperidino and morpholino, and X is selected from the group consisting of halogen and trihalomethyl.

13. A compound as defined in claim 12 having the variable radical X attached at the 6-position of the pyrazine ring.

14. The compound having the structure

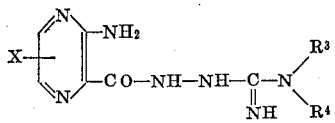

in which $R^3$ and $R^4$ respectively is selected from the group consisting of hydrogen, lower alkyl, lower alkoxy, phenyl, phenyl-lower alkyl, amino, and together with the nitrogen to which they are attached a member selected from the group consisting of 1-pyrrolidinyl, piperidino and morpholino, and X is selected from the group consisting of halogen and trihalomethyl.

15. A compound having the structure

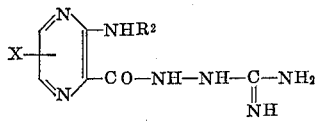

in which $R^2$ is selected from the group consisting of hydrogen and lower alkanoyl and X is selected from the group consisting of halogen and trihalomethyl.

16. (3-amino-6-chloropyrazinamido)guanidine.
17. (3-amino-6-bromopyrazinamido)guanidine.
18. (3-amino-5-iodopyrazinamido)guanidine.
19. 1 - (3 - amino-6-chloropyrazinamido)-3-methylguanidine.
20. 1 - (3-amino-6-chloropyrazinamido)-3-(2-hydroxyethyl)guanidine.
21. 1 - (3-amino-6-chloropyrazinamido)-3,3-dimethylguanidine.
22. 1 - (3-amino-6-chloropyrazinamido)-3-phenylguanidine.
23. (1 - (3-amino-6-chloropyrazinamido)-3-aminoguanidine.
24. 1 - (3-amino-6-chloropyrazinamido)-3-benzylguanidine.
25. 1 - (3 - amino-6-chloropyrazinamido)-3-phenethylguanidine.
26. (3-acetamido-6-chloropyrazinamido)guanidine.

References Cited by the Examiner
UNITED STATES PATENTS

| | | | |
|---|---|---|---|
| 1,672,029 | 6/1928 | Heyn | 260—564 |
| 2,408,694 | 10/1946 | Simon et al. | 260—564 |

NICHOLAS S. RIZZO, *Primary Examiner.*

HENRY R. JILES, *Examiner.*